(12) United States Patent
Hennessey et al.

(10) Patent No.: US 9,310,021 B2
(45) Date of Patent: Apr. 12, 2016

(54) RETENTION AND ROTATION ASSEMBLY AND METHOD OF USING THE SAME

(71) Applicant: The Music People, Inc., Berlin, CT (US)

(72) Inventors: James R. Hennessey, West Hartford, CT (US); James Robinson, Wolcott, CT (US)

(73) Assignee: The Music People, Inc., Berlin, CT (US)

( * ) Notice: Subject to any disclaimer, the term of this patent is extended or adjusted under 35 U.S.C. 154(b) by 194 days.

(21) Appl. No.: 14/055,312

(22) Filed: Oct. 16, 2013

(65) Prior Publication Data

US 2015/0102187 A1   Apr. 16, 2015

(51) Int. Cl.
*F16M 11/12* (2006.01)
*F16M 11/10* (2006.01)
*H04R 1/08* (2006.01)

(52) U.S. Cl.
CPC ......... *F16M 11/10* (2013.01); *F16M 2200/024* (2013.01); *H04R 1/08* (2013.01); *Y10T 403/32418* (2015.01)

(58) Field of Classification Search
CPC .............. B62B 2205/18; F16M 2200/022; Y10T 403/32172; Y10T 403/32368

USPC .............. 248/291.1, 292.12, 288.11
See application file for complete search history.

(56) References Cited

U.S. PATENT DOCUMENTS

| | | | |
|---|---|---|---|
| 2,532,173 A | | 11/1950 | Lewis |
| 2,745,688 A | * | 5/1956 | Farrington et al. ........... 403/103 |
| 4,548,446 A | * | 10/1985 | Warshawsky ................... 439/13 |
| 4,582,445 A | | 4/1986 | Warshawsky |
| 5,039,118 A | * | 8/1991 | Huang ..................... 280/47.371 |
| 5,146,808 A | | 9/1992 | Hoshino |
| 5,836,561 A | * | 11/1998 | Liao ........................... 248/291.1 |

* cited by examiner

*Primary Examiner* — Rodney Mintz
*Assistant Examiner* — Daniel Kenny
(74) *Attorney, Agent, or Firm* — Whitmyer IP Group LLC

(57) ABSTRACT

A retention and rotation assembly includes a first support having a first bore that extends along an axis AA. A lug is received in the first bore and is rotatable relative to the first support about the axis AA. The assembly includes a second support having a second bore. An inside surface of the second bore is engageable with an outside surface of the lug, the second support is fixed relative to the lug about the axis AA when second support is engaged with the lug. A locking element extends through a bore in the lug and into at least a portion of the second support. A rotation of the locking element in a first direction about the axis AA increases a friction between the lug and the first support thereby inhibiting rotation of the lug relative to the first support about the axis AA.

15 Claims, 11 Drawing Sheets

RETENTION AND ROTATION ASSEMBLY AND METHOD OF USING THE SAME

FIELD OF THE INVENTION

The present invention relates to a retention and rotation assembly for facilitating selective positioning of a first support relative to a second support.

BACKGROUND OF THE INVENTION

A retention and rotation assembly facilitates connection of two supports so that they can be moved with respect to each other about one or more predetermined axis of rotation. Some known assemblies are configured to provide selective positioning of a first support relative to a second support about an axis of rotation and provide a mechanism for locking the positioning of the first support relative to the second support about the axis for rotation. Some of assemblies have readily actuatable mechanisms for locking or unlocking the relative freedom of movement of a first support relative to a second support about an axis of rotation.

Such retention and rotation assemblies are used in many different applications. One such example is the in the fields of performing arts. A performing artist may use a microphone stand having a retention and rotation assembly that enables the performer to adjust the relative angle of two members, also referred to as supports, of the microphone stand. After a desired positioning is selected, the assembly enables the performer the readily fix the position of the first support relative to the second support. Quick acting retention and rotation assemblies are particularly desirable, for example, during a performance, or prior thereto, when time is of the essence and it is desired to achieve the preferred positioning of two supports with relative ease and quickness. For example, during the performance of song, a performer may desire to unlock the position of two supports, adjust the position of the supports to adjust the position of a microphone, and relock the position of the two supports in a matter of just a few seconds. Such retention and rotation assemblies facilitate such action.

Such assemblies are used in many different areas of the performing arts. For example, such assemblies may be used in microphone stands, for example, to support a microphone for one or more drums in a drum kit, to support a microphone for an acoustic guitar, to support a vocal microphone, or to support a microphone for a percussion instrument. Such assemblies may be further used to support portions of the drum kit or for example, to support portions of a lighting rig. Such assemblies, for example, may be used to support a tablet computer that is visible to a performer. During the performance, the position of the tablet can be easily and quickly adjusted and fixed to provide the desired angle of view of the tablet screen. It should be understood that while the field of performing arts is described above, use of retention and rotation assemblies may be used in many different applications, including those outside the music industry, and the above described examples are provided for illustration purposes only and are not intended to be limiting. For example, such assemblies may be used in a hospital, on a construction site, in an office, in the home, or in a garage, among other applications.

An example of such known assemblies is disclosed in U.S. Pat. No. 5,146,808 to Hoshino. The disclosed angle adjusting mechanism includes a holding member and a rotary member rotatable relative thereto. A plurality of plates are disposed between the rotary and holding members. The holding member is provided with a plurality of claw teeth at the inner periphery of one arcuate segment and the rotary member is provided with a respective plurality of claw teeth over a different arcuate segment of the inner periphery thereof. A first plurality of fixed plates, including claw teeth on their peripheries, engage the teeth of the holding member, on a second plurality of rotary plates, including claw teeth on their peripheries, engage the claw teeth on the inner periphery of the rotary member. A clamping bolt is provided to draw the rotary and holding members together and compress the fixed and rotary plates together fixing their relative orientations, thereby to fix the rotative (angular) orientation of the rotary member with respect to the holding member.

Another example of such known assemblies is disclosed in U.S. Pat. No. 4,582,445 to Washawsky. Washawsky discloses a quick releasing articulable joint having a pair of joint halves that each include substantially cylindrical joint portions and end portions. Aligned openings are formed through the joint portions to receive a connecting pin which connects the joint halves together. The connecting pin includes teeth on its outer surface sized to mate with teeth formed in the aligned openings of the joint halves. The connecting pin has a locked condition wherein its teeth mate with the teeth of both the joint halves and thus prevent relative rotation thereof, and an unlocked condition wherein its teeth are not in mating engagement with the teeth of one of the joint halves thus permitting relative rotation of one joint half with respect to the other. A spring urges the connecting pin into its locked condition and an operating button, disposed at one end of the connecting pin, facilitates movement of the pin so that its teeth move out of mating engagement with the teeth on one of the joint halves.

Another example of such known retention and rotation assemblies is disclosed in U.S. Pat. No. 4,548,446 to Washawsky. That assembly includes a substantially hemispherical joint half disposed adjacent a second substantially hollow substantially hemispherical joint half to form therewith a substantially spherical articulable joint. A tapered opening extends through the first joint half to receive the tapered end of a connecting pin and provide a frictional contact fit therewith. Spline like teeth are formed on the internal surface of an opening extending through said second joint half to receive spline like teeth also formed on said connecting pin to provide a sliding but not rotative fit therewith. A threaded fastener, received through said second opening and into the respective end of the connecting pin means when turned in a first predetermined direction draws in the connecting pin means to draw the joint halves together and provide a strong articulable joint with each half capable of rotating with respect to the other half about an axis through the connecting pin means.

A disadvantage with such known assemblies is that there is a tendency of the retention of a first support relative to a second support to slip over time, or under relatively higher loads. This can be particularly disadvantageous when such slippage occurs when the assembly is being used. For example, if during a studio recording, a performer is relying on data displayed from a tablet computer supported in part by such an assembly and the assembly begins to slip or give way, the performer could become distracted or disengaged from her pursuit thus jeopardizing the integrity of the recorded performance.

Another disadvantage of such known assemblies is that they include a relatively large number of components, and are therefore difficult to manufacture and subject to higher rates of failure. In addition, such assemblies may be difficult to operate in the performing arts environment, where, for example, many artists are traveling between different venues and have to set up and break down equipment on a periodic and frequent basis.

Another disadvantage of such known assemblies is that they tend to be difficult to efficiently and correctly operate. These difficulties may become more prevalent when quick actuation of the retention/release mechanism is desired, for example, during a performance.

What is needed then, is a retention and rotation assembly and a method for using the same which minimizes the above-described drawbacks of traditional retention and rotation assemblies.

SUMMARY OF THE INVENTION

It is an object of the present invention to provide a retention and rotation assembly and a method of using the same that overcomes the problems with the prior art.

These and other objects of the present invention are achieved by provision of a retention and rotation assembly. In one embodiment, the assembly includes a first support having a first bore that extends along an axis AA. A lug is received in the first bore and is rotatable relative to the first support about the axis AA. The assembly includes a second support having a second bore. An inside surface of the second bore is engageable with an outside surface of the lug. The second support is fixed relative to the lug about the axis AA when second support is engaged with the lug. A locking element extends through a bore in the lug and into at least a portion of the second support. A rotation of the locking element in a first direction about the axis AA increases a friction between the lug and the first support thereby inhibiting rotation of the lug relative to the first support about the axis AA.

In one embodiment of the present invention, a rotation of the locking element in a second direction about the axis AA decreases a friction between the lug and the first support thereby facilitating rotation of the lug relative to the first support about the axis AA.

In yet another embodiment of the present invention, the assembly includes a threaded surface on an inside surface of the first bore. The assembly further includes a threaded surface on an outside surface of the first lug. The lug is in threaded engagement with the first support when the lug is received in the first bore.

In yet another embodiment of the present invention, the rotation of the locking element in the first direction increases a friction between the threaded surface on the outside surface of the lug and the threaded surface on the inside surface of the first bore.

In yet another embodiment of the present invention, the rotation of the locking element in the second direction decreases the friction between the threaded surface on the outside surface of the lug and the threaded surface on the inside surface of the first bore.

In yet another embodiment of the present invention, the locking element extends between a proximal and distal end. In yet another embodiment of the present invention, a portion of the locking element proximate to its distal end is threaded. In yet another embodiment of the present invention, the second support defines a threaded portion that is configured to receive the threaded portion of the locking element.

In yet another embodiment of the present invention, the locking element comprises a shoulder near its proximal end. In yet another embodiment of the present invention, a rotation of the locking element in the first direction about the axis AA compresses the lug between the second support and the shoulder of the locking element.

In yet another embodiment of the present invention, an inside surface of the second bore proximate to an end thereof includes a plurality of alternating teeth and teeth gaps. An outside surface of the lug proximate to an end thereof includes a plurality of alternating teeth and teeth gaps. The teeth and teeth gaps of the second bore are complementary to the teeth and teeth gaps of the lug so that the second bore and the lug are engageable therewith.

In yet another embodiment of the present invention, the lug and the second support are a continuous element.

In yet another embodiment of the present invention, a stand is provided. The stand includes a base and a first support extending from the base and having a distal end remote therefrom. The stand includes a first bore extending along an axis AA through the distal end of the first support. A lug is received in the first bore and is rotatable relative to the first support about the axis AA. The stand includes a second support having a distal end. The second support has a second bore remote from its distal end. An inside surface of the second bore is engageable with an outside surface of the lug. The second support is fixed relative to the lug about the axis AA when the second support is engaged with the lug. A locking element extends through a bore in the lug and into at least a portion of the second support. A rotation of the locking element in a first direction about the axis AA increases a friction between the lug and the first support thereby inhibiting rotation of the lug relative to the first support about the axis AA.

The invention and its particular features and advantages will become more apparent from the following detailed description considered with reference to the accompanying drawings.

DETAILED DESCRIPTION OF THE INVENTION

Figure 1:
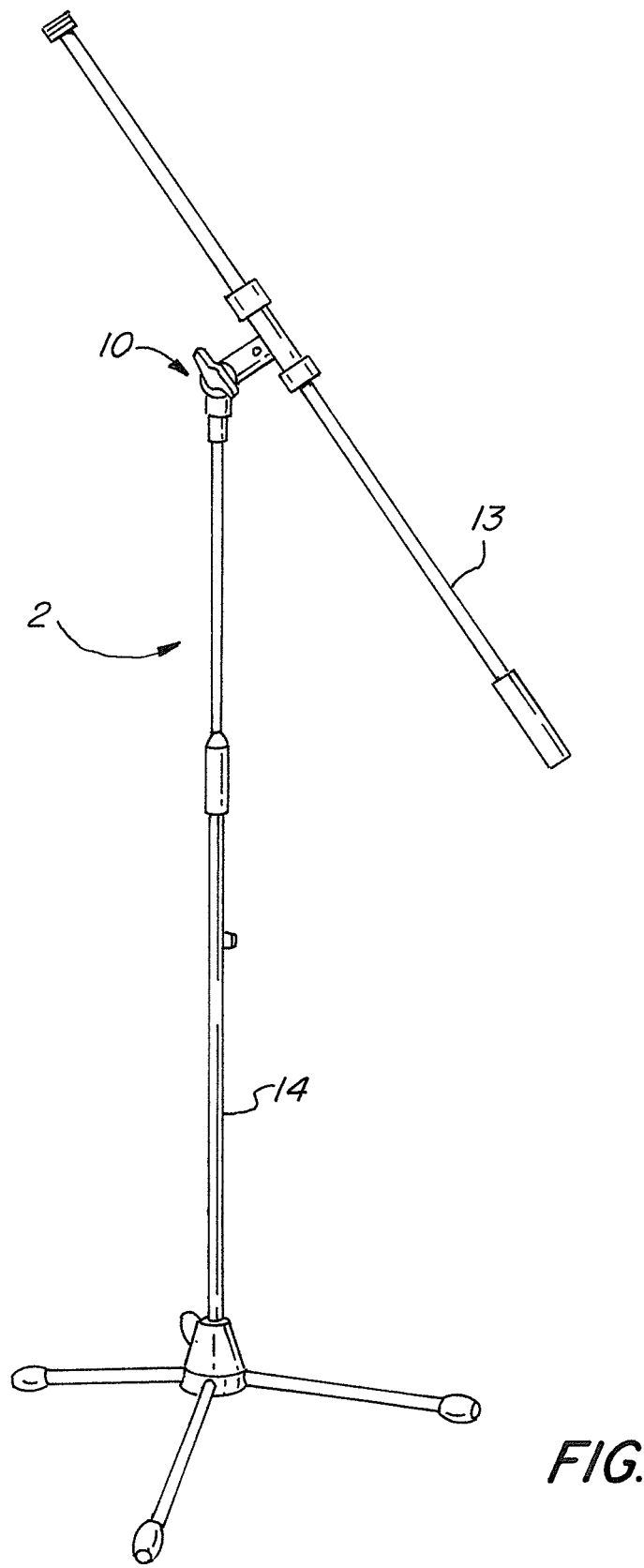
FIG. 1 is a perspective view of a boom microphone stand incorporating a retention and rotation assembly according to one embodiment of the present invention.
Figure 2:
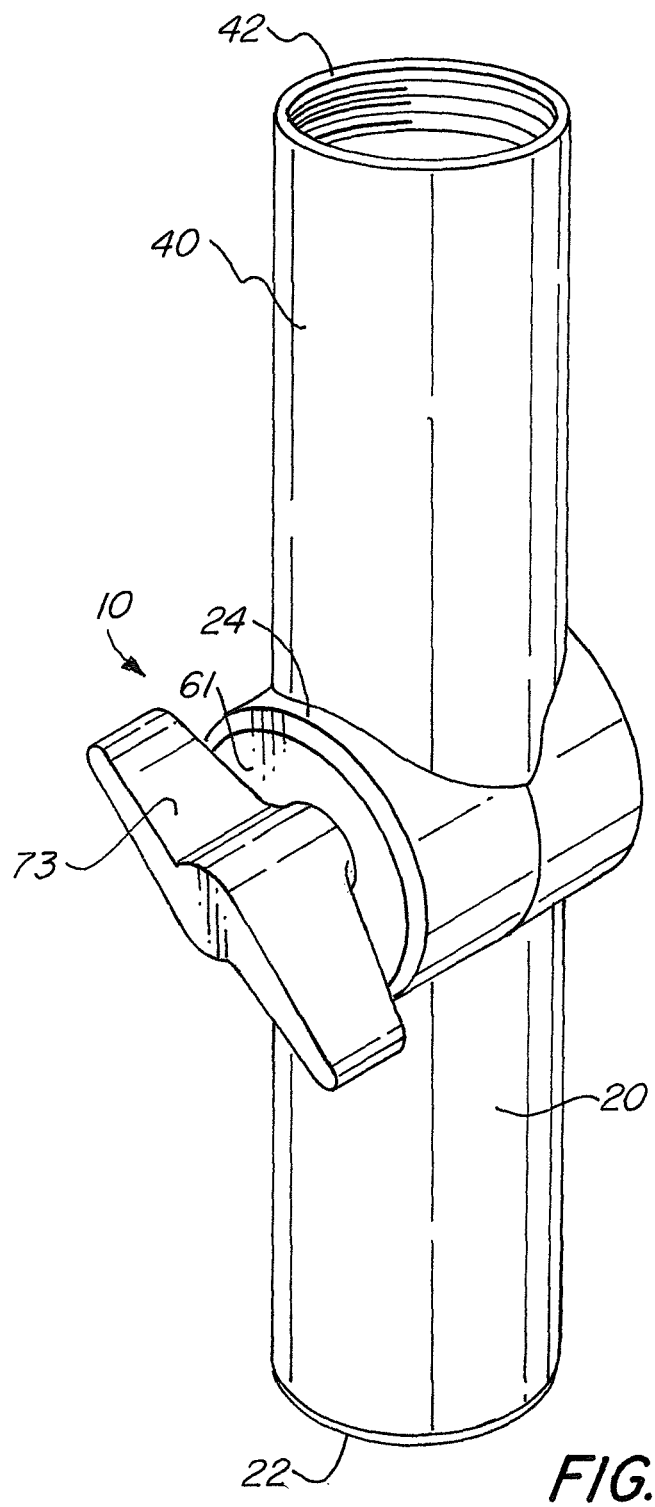
FIG. 2 is a perspective view of a retention and rotation assembly according to one embodiment of the present invention.

A retention and rotation assembly 10 in accordance with one embodiment the present invention is shown in the FIGS. FIG. 1 illustrates a boom microphone stand 2 incorporating the rotation and retention assembly 10. As is explained in detail below, the assembly 10 facilitates positioning and retention of the boom 13 relative to a vertical support 14.

FIGS. 2-14 illustrate one embodiment of a retention and rotation assembly 10 in accordance with the present invention. It should be understood that this disclosure may use the term assembly 10 to refer to the retention and rotation assembly 10. The disclosure is made with general reference to FIGS. 1-15, and with further reference to specific FIGS.

Figure 3:
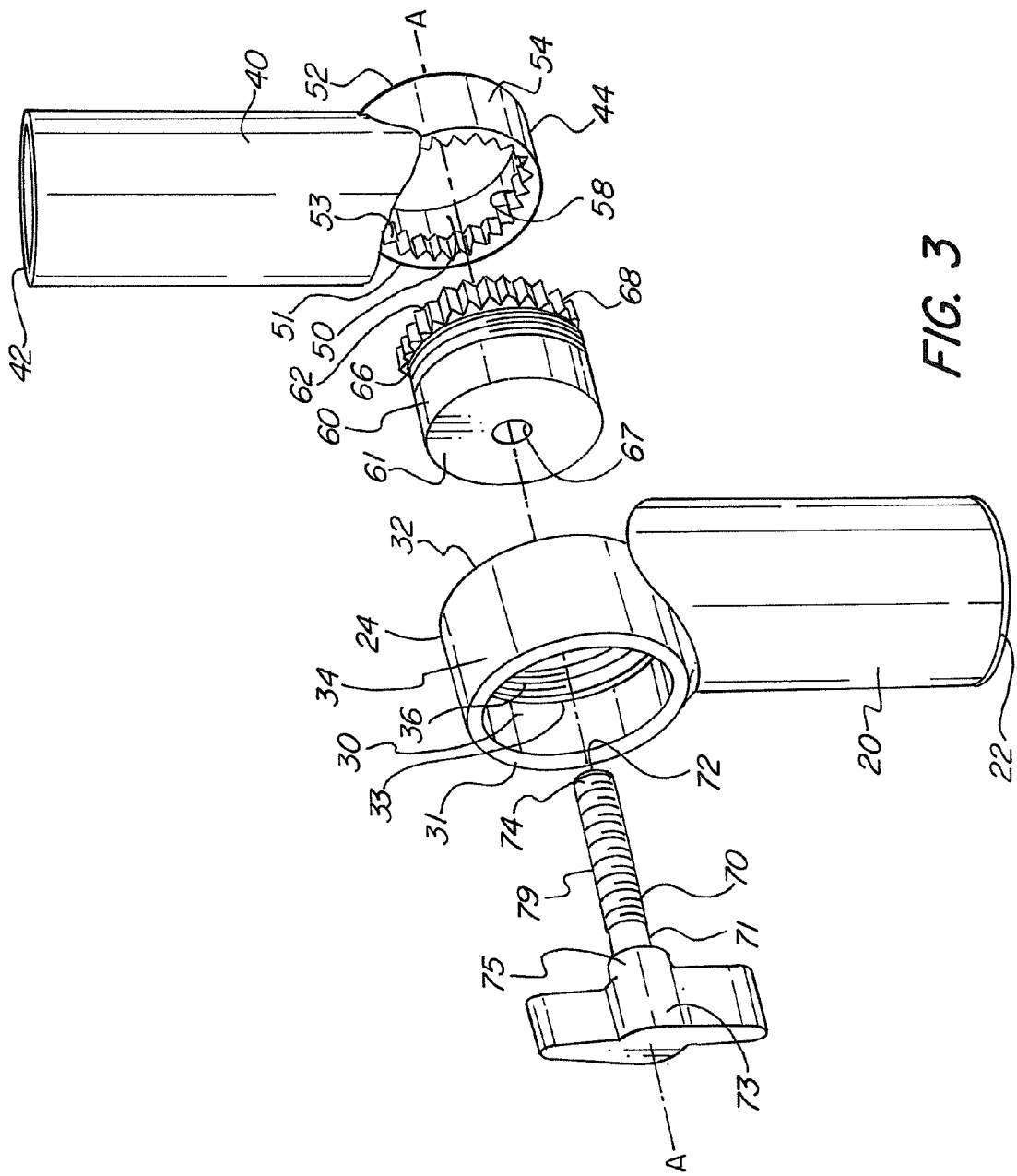
FIG. 3 is a perspective exploded view of the retention and rotation assembly shown in FIG. 2.

In reference to FIG. 3, the assembly includes a first support 20 and a second support 40. The first support 20 extends along a longitudinal axis between a first end 22 and a second end 24. The first support 20 defines a first bore 30 that extends through a portion of the first support 20 proximate to the second end 24 thereof. In the embodiment shown 10, the bore 30 extends along an axis AA that is substantially perpendicular to the longitudinal axis of the first support 20. It should be understood, however, that the present invention is not limited in this regard and that the bore 30 may extend along an axis that is not perpendicular to the longitudinal axis of the first support 20.

The first bore 30 extends between a first end 31 and a second end 32. The first bore 30 defines a concave arcuate inside surface 33. The area of the first support 20 proximate to and outside of the first bore 30 defines a convex arcuate outside surface 34. It should be understood that the present invention is not limited in this regard. For example, the outside surface 34 may be flat, angled, or have some other configuration. The portion of the first support 20 remote from the first bore 30 is generally cylindrical about the longitudinal axis of the first support 20. It should be understood, however, the present invention is not limited in this regard. In the embodiment shown, the first support 20 is formed from two cylindrical hollow components of stainless steel that are welded together to form the disclosed configuration of the first bore 30 relative to the remaining portion of the first support 20.

Figure 4:
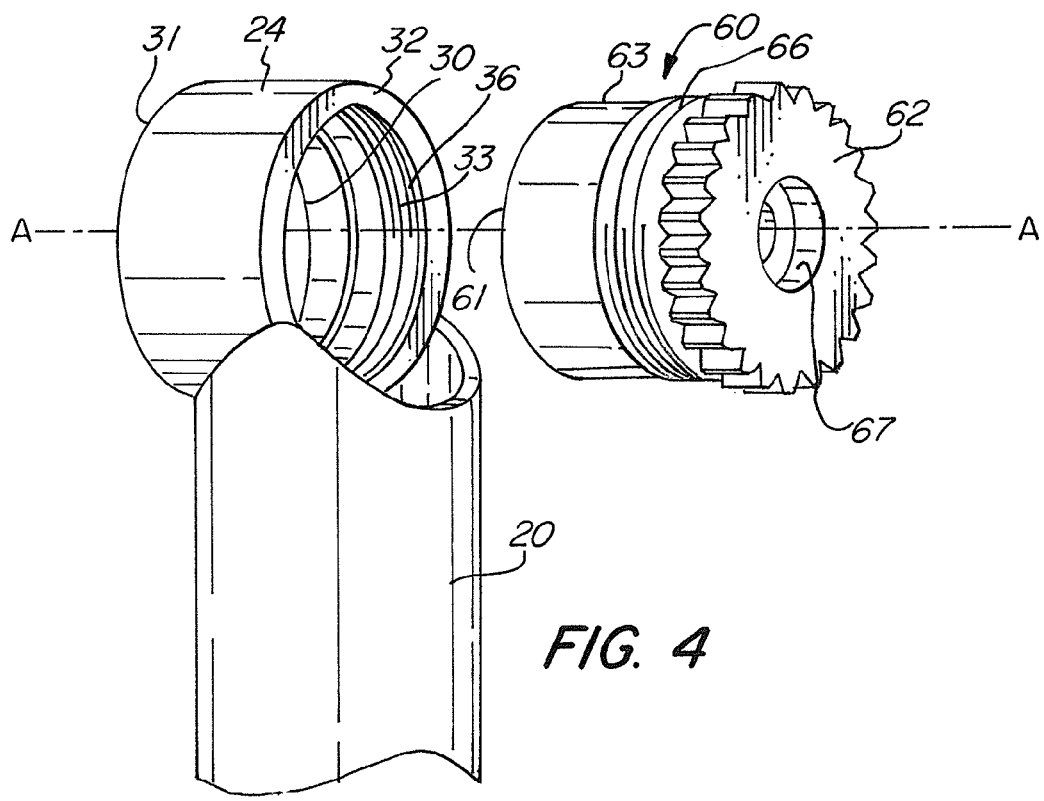
FIG. 4 is a perspective exploded view of a portion of the retention and rotation assembly shown in FIG. 2.
Figure 5:
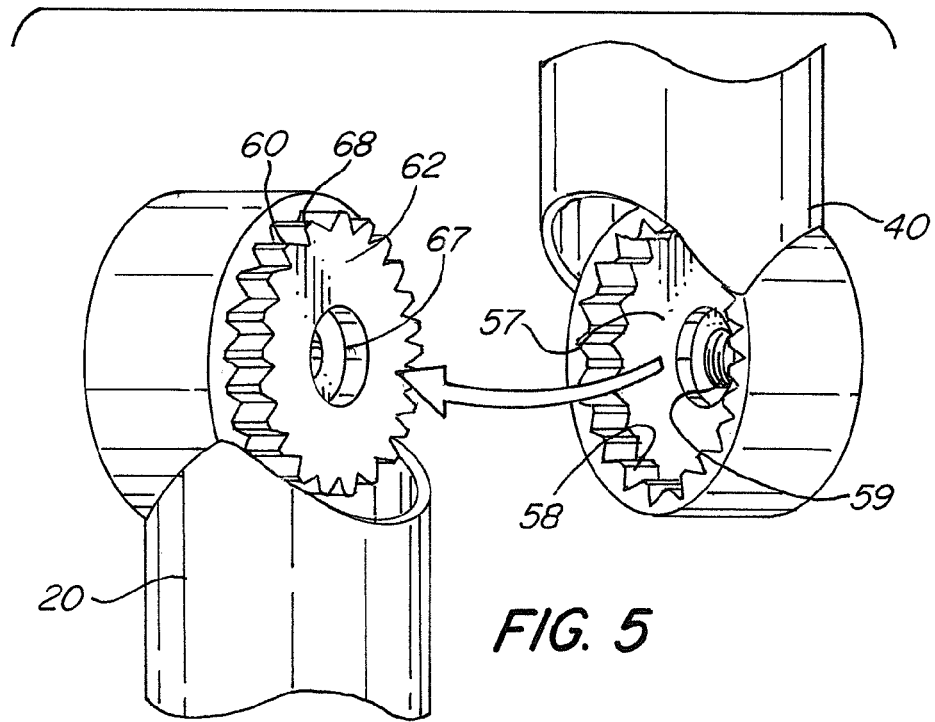
FIG. 5 is an exploded view of a portion of the retention and rotation assembly shown in FIG. 2.

In reference to FIGS. 3-4, the assembly 10 comprises a lug 60. The lug 60 is received in the first bore 30 as shown in FIG. 5. The lug 60 extends along an axis from a first end 61 to a second end 62. The lug 60 is generally cylindrical about its axis and defines a convex arcuate outside surface 63. The lug 60 is rotatable relative to the first support 20 about the axis of rotation AA when the lug 60 is received in the first bore 30. The lug 60 includes a threaded portion 66 on the outside surface 63 thereof. The first support 20 includes a threaded portion 36 on an inside surface 33 of the first bore 30.

When the lug 60 is received in the first bore 30, the lug is in threaded engagement with the first support 20 via the complementary set of threads 36, 66. The lug 60 is generally rotatable relative to the first support 20 about the axis of rotation AA via the plurality of complementary threads 36, 66. As the lug 60 rotates relative to the first support 20 about the axis of rotation AA the lug translates linearly relative to the first support along the axis AA in a ratio proportional to the lead of the threads 33, 66. It should be understood that the present invention is not limited to the threaded configuration in the embodiment disclosed in the FIGS. For example, in one embodiment, the respective surfaces of the lug 63 and the first bore 33 are configured so that the lug 60 remains axially fixed relative to first support 20 along the axis AA when the lug rotates relative to first support about axis AA.

In specific reference to FIG. 3, the assembly 10 includes a second support 40. The second support 40 is generally similar in configuration to the first support 20. The second support 40 extends along a longitudinal axis between a first end 42 and a second end 44. The second support 40 defines a second bore 50 that extends through at least a portion of the second support 40 proximate to the second end 44 thereof. In the embodiment shown, the bore 50 extends along an axis AA that is substantially perpendicular to the longitudinal axis of the second support 40. It should be understood, however, that the present invention is not limited in this regard, and that the second bore 50 may extend along an axis that is not perpendicular to the longitudinal axis of the second support 40.

The second bore 50 extends between a first end 51 and a second end 52. The second bore 50 defines a concave arcuate inside surface 53. The area of the second support 50 proximate to and outside of the second bore 50 defines a convex arcuate outside surface 54, although it should be understood that the present invention is not limited in this regard. For example, the outside surface 54 may be flat, angled, or have some other configuration. The portion of the first support 40 remote from the second bore 50 is generally cylindrical about the longitudinal axis of the second support 40. It should be understood, however, the present invention is not limited in this regard. In the embodiment shown, the second support 40 is formed from two cylindrical hollow components of stainless steel that are welded together to provide the disclosed configuration.

In reference to FIG. 5, the lug 60 is shown received in the first bore 30 of the first support 20. The lug 60 includes a plurality of teeth and teeth gaps 68 extending along an outside surface of the lug 60 proximate to its second end 62. The second support 40 includes a plurality of teeth and teeth gaps 58 extending along the inside surface 53 of the second bore 50. The teeth and teeth gaps 58, 68 are complementary such that when the second bore 50 is received over the second end 62 of the lug 60 the teeth and teeth gap patterns 58, 68 of the second bore 50 and the lug 60 engage each other thereby fixing rotation of the second support 40 relative to the lug 60 about the axis of rotation AA. It should be understood that although an interlocking teeth and teeth gap pattern is shown in the disclosed embodiment for engaging the second support 40 and the lug 60, the present invention is not limited in this regard as other configurations may be employed. A person of ordinary skill in the art and familiar with this disclosure will understand that other configurations may be employed for engaging the two components, or that the lug and second support may comprise a single continuous component.

In reference to FIGS. 3 and 5, the second bore 50 has an opening at its first end 51 and is closed at its second end 58. The second support 40 includes an opening 57 in the closure proximate to the second end 58 of the second bore 50 positioned along the axis AA.

The lug 60 includes a lug bore 67. The lug bore 67 extends along the axis of rotation AA when the lug 60 is received in the first bore 30. The lug bore 67 extends through the lug 60 between a first opening proximate to the first end 61 of the lug 60 and a second opening proximate to the second end 62 of the lug 60. In the embodiment shown, the inside surface of the lug bore 67 is smooth.

Figure 6:
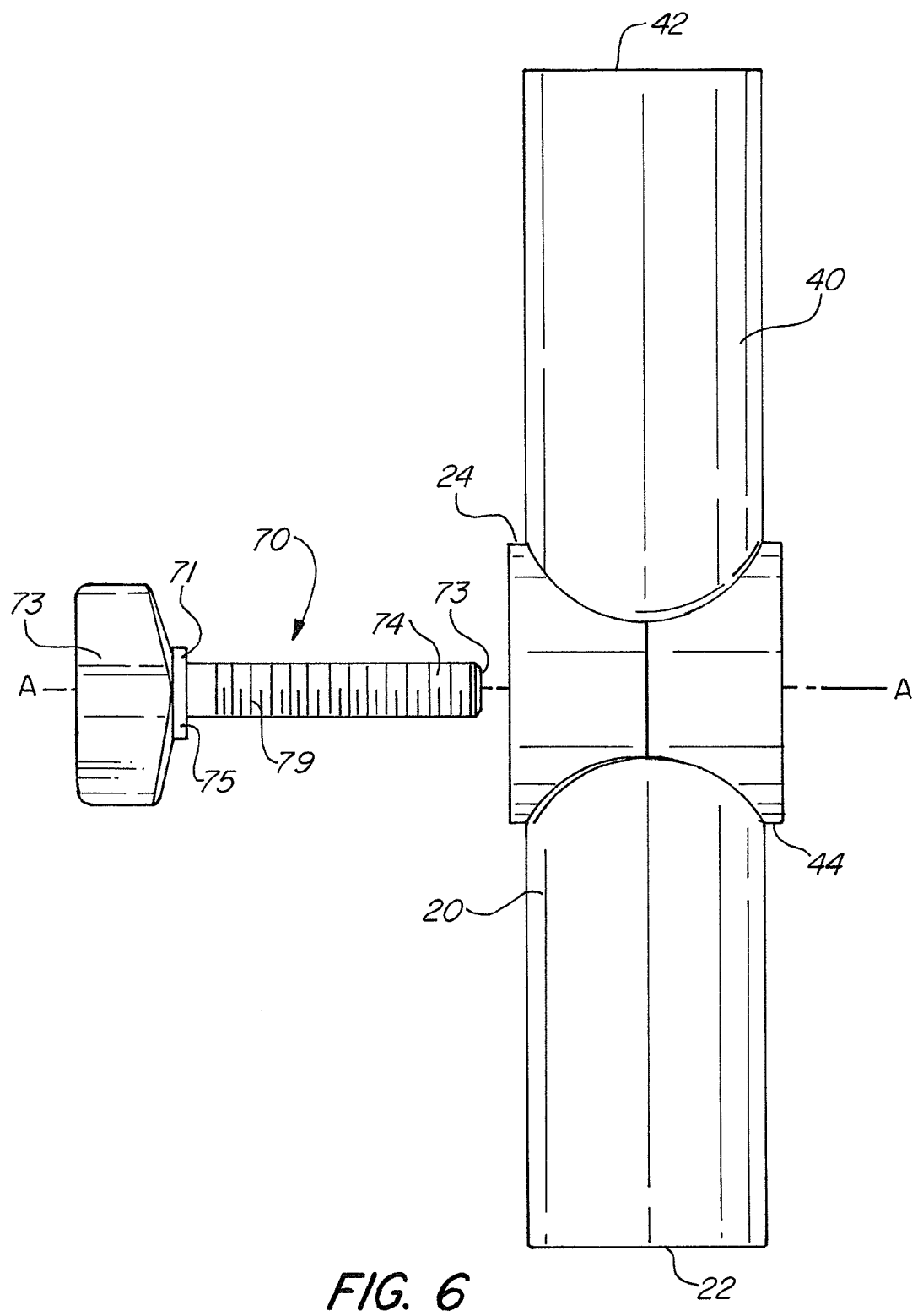
FIG. 6 is a side view of the retention and rotation assembly shown in FIG. 2, in which the locking element is removed from the assembly.
Figure 7:
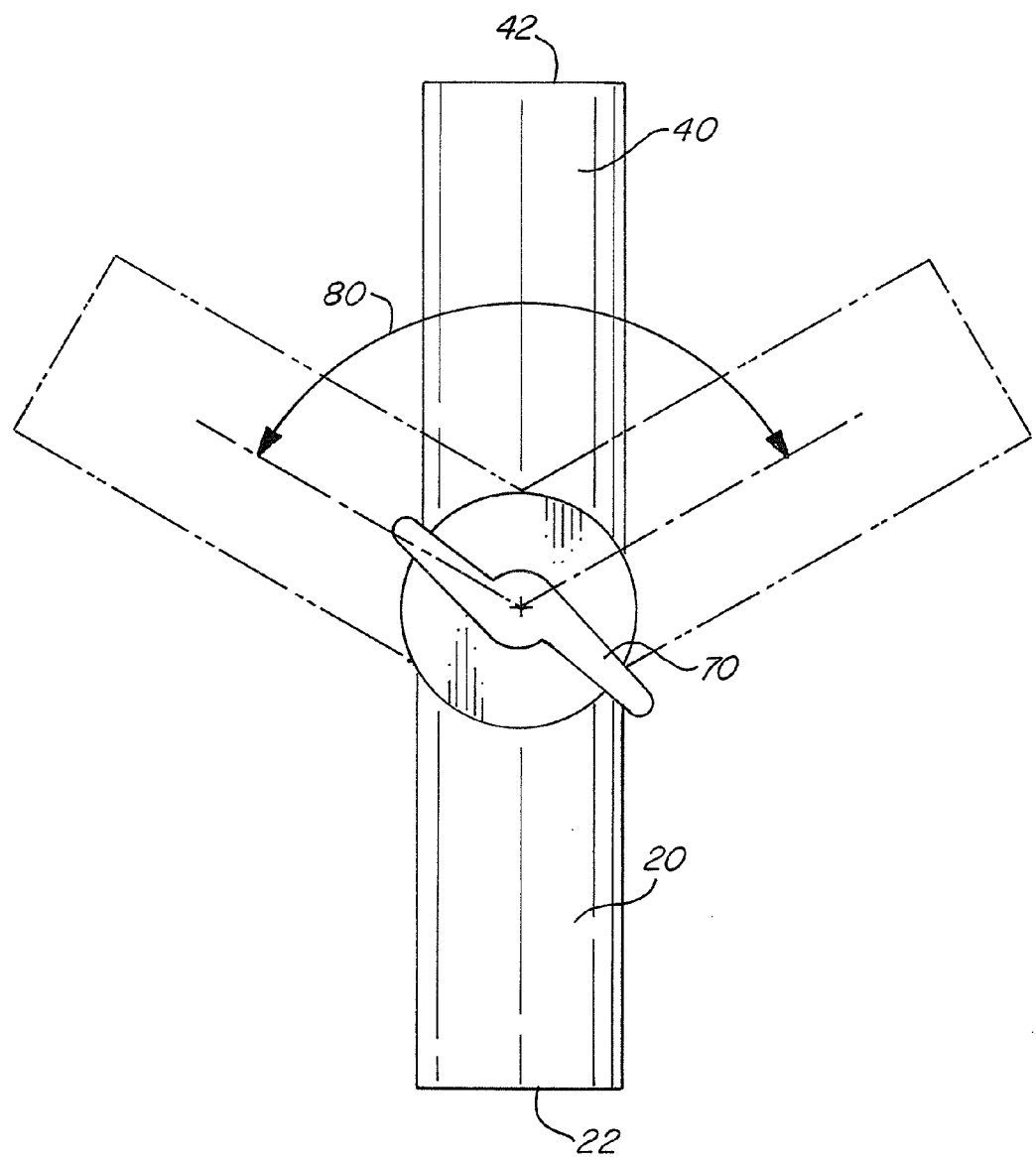
FIG. 7 is a top view of the retention and rotation assembly shown in FIG. 2 illustrating the range of rotation of the first support relative to the second support about the axis of rotation AA.
Figure 8:
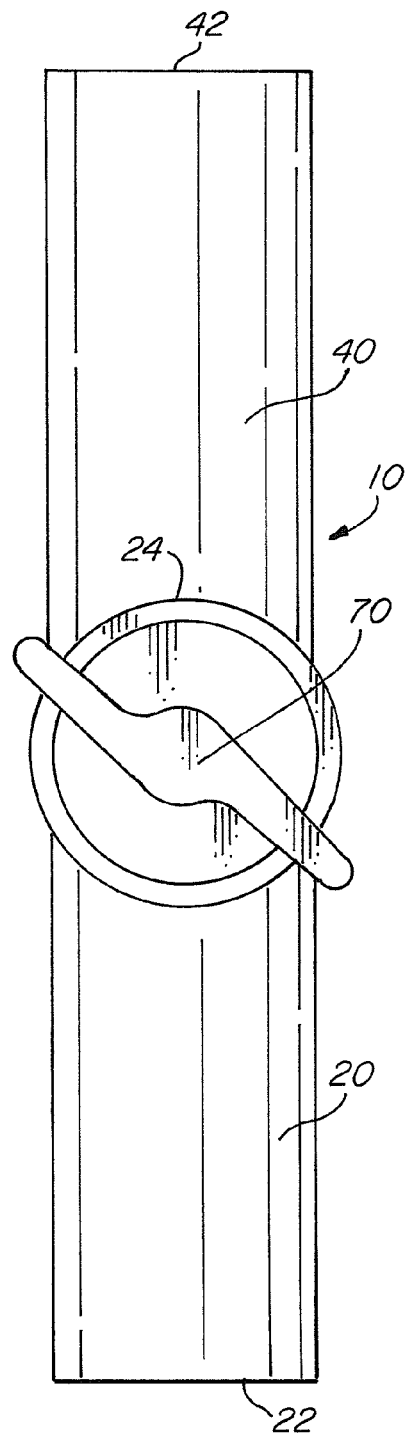
FIG. 8 is a top view of the retention and rotation assembly shown in FIG. 2.
Figure 9:
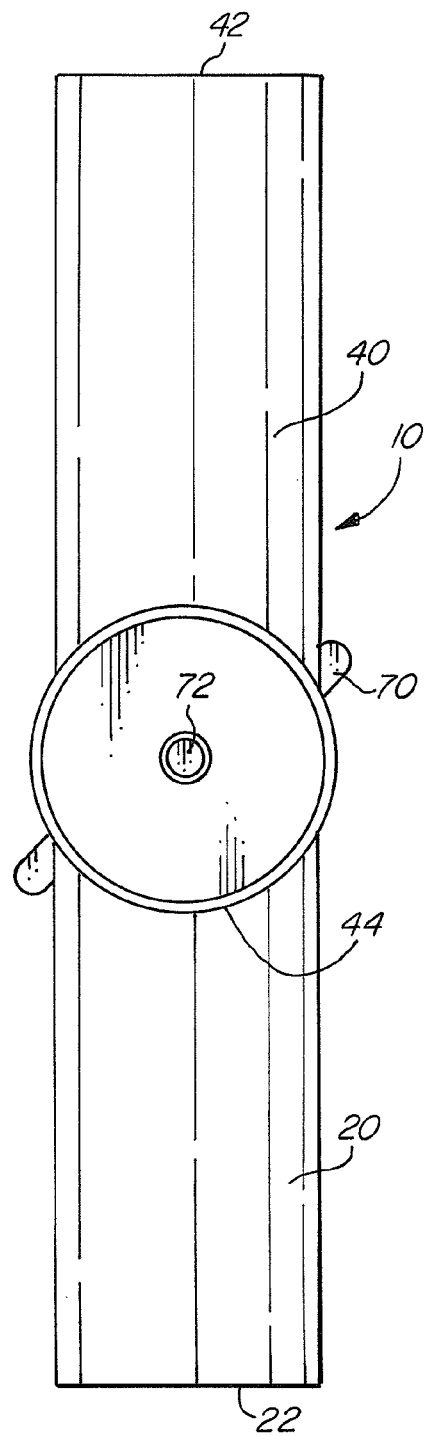
FIG. 9 is a bottom view of the retention and rotation assembly shown in FIG. 2.
Figures 10, 11, 12:
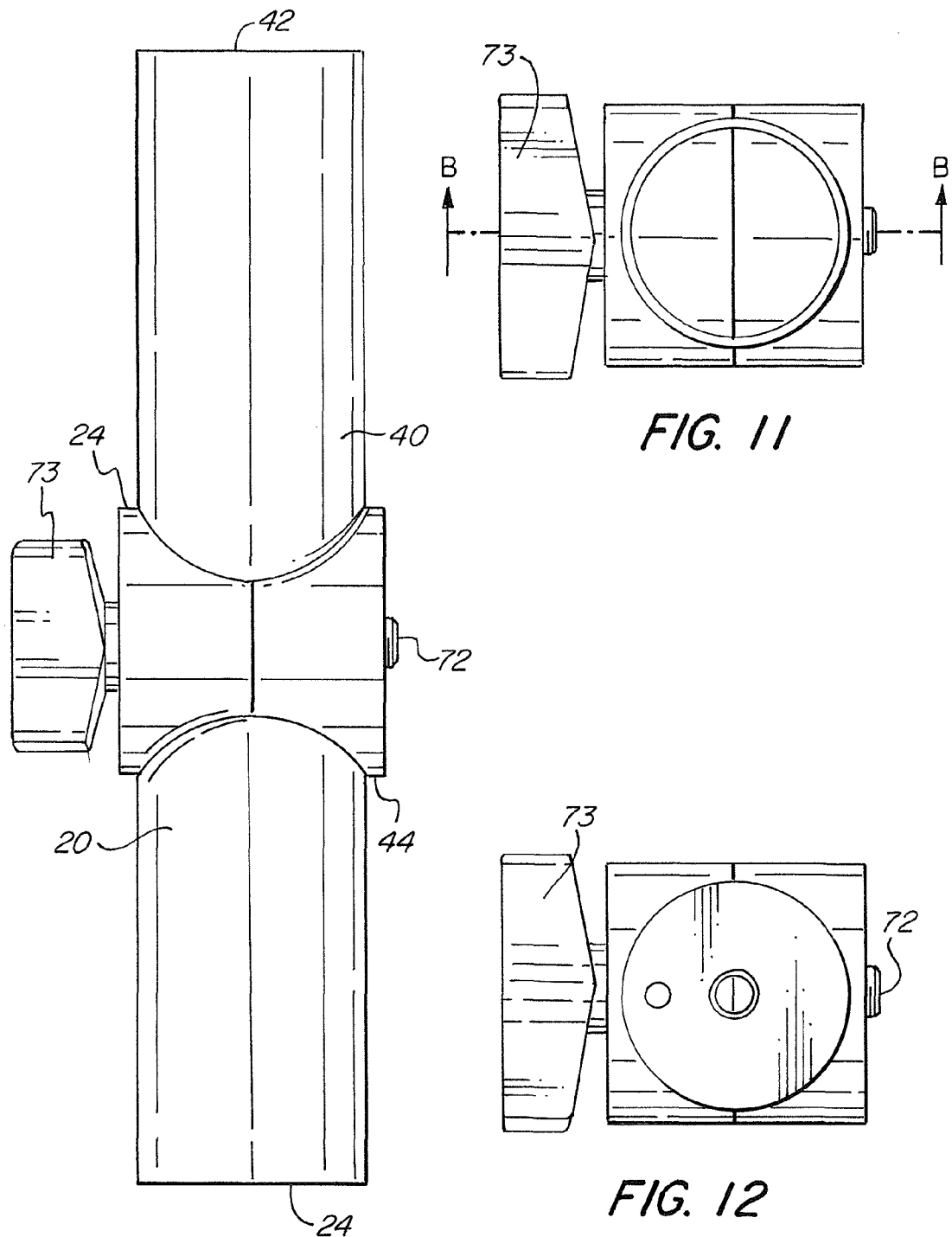
FIG. 10 is a side view of the retention and rotation assembly shown in FIG. 2.
FIG. 11 is a front view of the retention and rotation assembly shown in FIG. 2.
FIG. 12 is a rear view of the retention and rotation assembly shown in FIG. 2.

In reference to FIG. 6, the assembly 10 includes a locking element 70. The locking element 70 includes a shaft 79 that extends between a proximal end 71 and a distal end 72 along a longitudinal axis. The shaft 79 is generally cylindrical in a cross sectional plane perpendicular to its longitudinal axis. An outside diameter of the shaft 79 is less than an inside diameter of the lug bore 67 at its first opening such that at least a portion of the shaft of the locking element 70 can pass through the lug bore 67 without substantial interference. A portion of the shaft proximate to its distal end 72 is threaded 74. In the embodiment shown, the threaded portion 74 extends along substantially the entire length of the shaft 79. It should be understood, however, that the threaded portion 74 may be confined a portion of the shaft proximate to its distal end 72.

The threaded portion 74 is configured to be received in the threaded 59 opening 57 of the second support 40 to form a threaded engagement. The locking element 70 includes a bow 73 proximate to the proximal end 71 of the shaft 79. The bow 73 provides a surface for a user, such as a performing artist, to rotate the locking element 70 about an axis of rotation. In the embodiment shown, the bow 73 extends through a plane being generally parallel to the longitudinal axis of the locking element 70.

As shown, for example in FIG. 6, the locking element 70 includes a shoulder 75 disposed between the bow 73 and the shaft 79 of the locking element 70. The shoulder 75 has a cross sectional area extending in a plane perpendicular to longitudinal axis of the locking element 70 that is greater than a largest diameter of the opening of the lug bore 67 at its first end 61. In this way, the shoulder 75 is configured so that it cannot pass through the opening of the lug bore 67 proximate to the first end of the lug 60.

Figure 13:
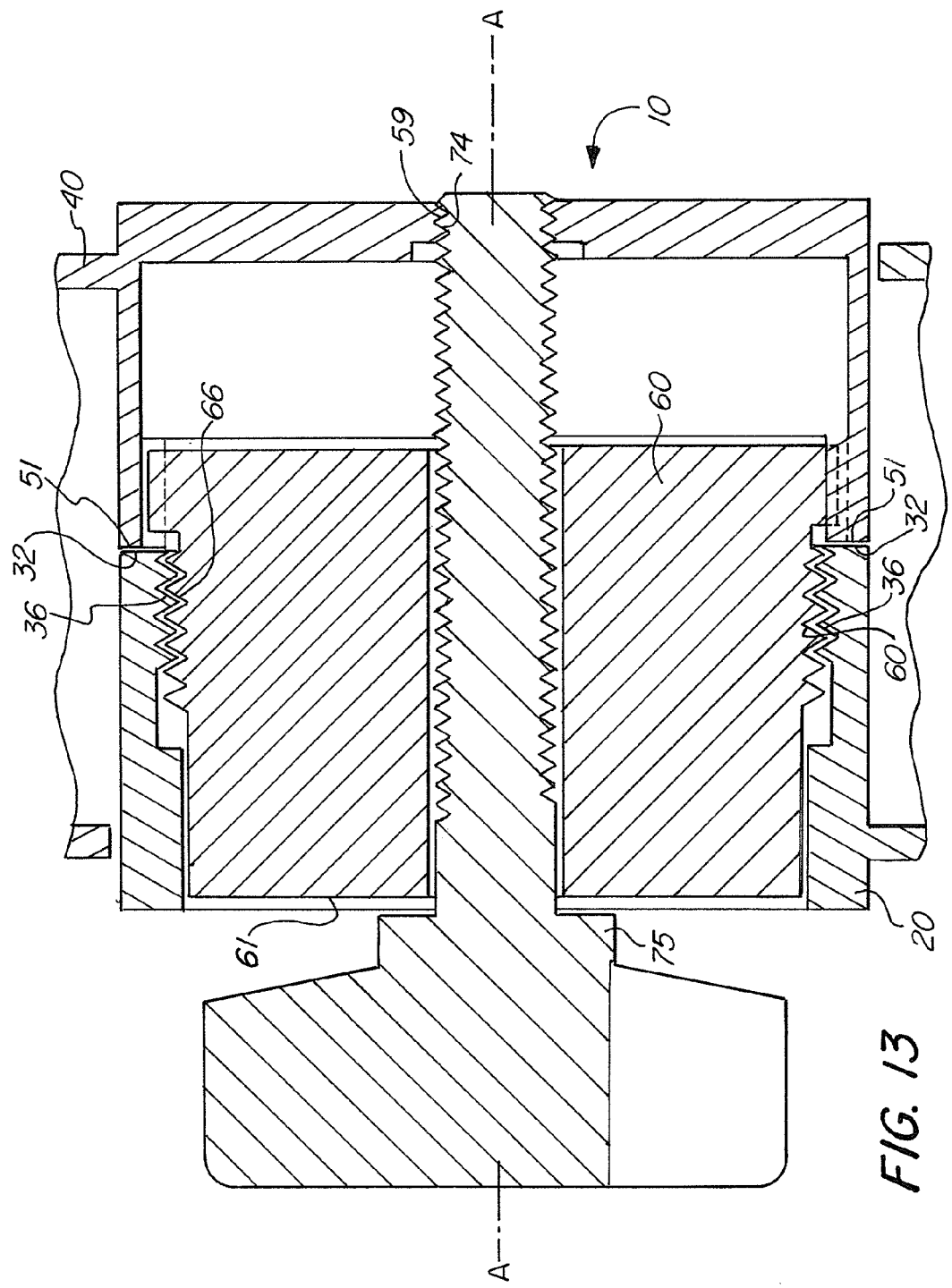
FIG. 13 is a cross sectional view BB of a portion of the retention and rotation assembly shown in FIG. 2 wherein the assembly is in an unlocked position so that the first support is rotatable relative to the second support about the axis of rotation AA.
Figure 14:
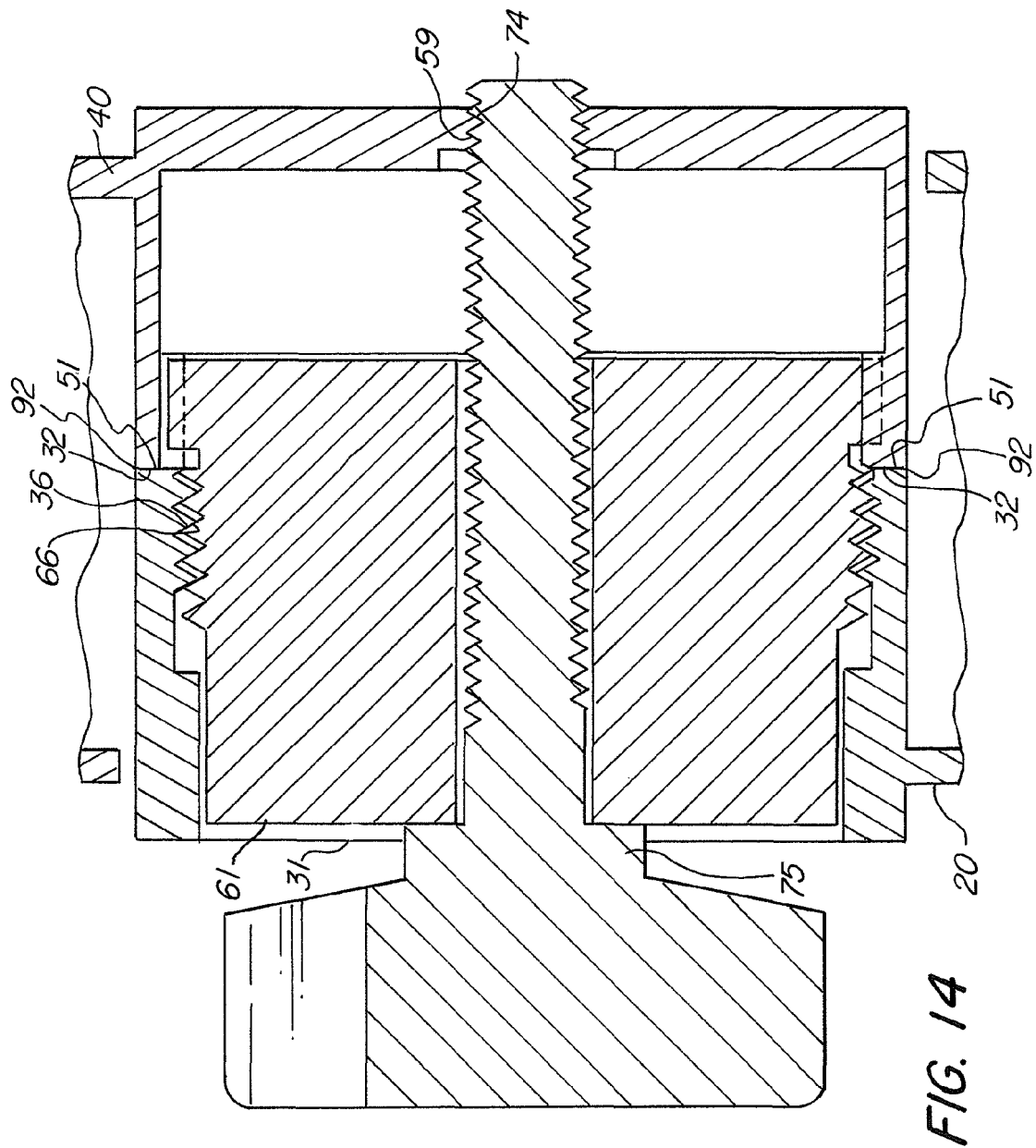
FIG. 14 is a cross sectional view BB of a portion of the retention and rotation assembly shown in FIG. 2 wherein the assembly is in a locked position so that the first support is fixed relative to the second support about the axis of rotation AA.

In reference to FIGS. 13 and 14, a cross sectional view of the assembly 10 is shown. FIG. 13 illustrates the assembly 10 in an unlocked position wherein the first support 20 is rotatable relative to the second support 40 about the axis of rotation AA. It should be noted that in the unlocked position, the lug 60 is fixed about the axis of rotation AA relative to the second support 50 via the engagement of the plurality of teeth and teeth gaps 58, 68. Thus, in the unlocked position first support 20 is also rotatable relative to the lug 60 about the axis of rotation AA.

FIG. 14 illustrates the assembly 10 in the locked position wherein the first support 20 is fixed relative to the second support 40 about the axis of rotation AA. It should be understood that the lug 60 is fixed about the axis of rotation AA relative to the second support 50 via the engagement of the plurality of teeth and teeth gaps 58, 68. Thus, in the locked position the first support 20 is fixed relative to the lug 60 about the axis of rotation AA.

As will be explained in further detail below, the assembly 10 is configured to fix the rotation of the first support 20 relative to the second support 40 about the axis of rotation AA. It will be understood by a person of ordinary skill in the art and familiar with this disclosure that if a large enough torque is applied to one or more of the first and second supports 20, 40 relative to the other the supports 20, 40 the first and second support may rotate relative to each other about the axis of rotation AA while in the locked position. Therefore, it may be said that the assembly 10 inhibits rotation of the first support 20 relative to the second support 40 in the locked position. As is discussed above, the present invention is directed to providing assembly that, in part, inhibits such slippage during use.

In reference to FIG. 13, the assembly 10 is in the unlocked position. The lug 60 is received in the first bore 30. The lug 60 is in threaded engagement with the first support 20 via the complementary set of threads 36, 66. The lug 60 is generally rotatable relative to the first support 20 about the axis of rotation AA via the plurality of complementary threads 36, 66. The second bore 50 is received over the second end 62 of lug 60 such that the teeth and teeth gaps 58, 68 of the second bore 50 and the lug 60 thereby engage each other to fix the lug relative to the second support 40 about the axis of rotation AA.

In further reference to FIG. 13, the locking element 70 is received in the assembly 10 such that the shaft 79 extends through the lug bore 67 and the distal end of the shaft 73 is received in the opening 57 such that the locking element 70 is in threaded engagement with second support 40 via the complementary set of threads 59, 74. There is a space between the first end 61 of the lug 60 and the shoulder 75 of the locking element 70. In this unlocked position, the first support 20 can rotate relative to the lug 60 and relative to the second support 40 about the axis of rotation AA. In this manner, the assembly allows a person, such as a performing artist, to adjust the position of the first support 20 relative to the second support 40 about the axis of rotation AA. In reference to FIG. 7, the range 80 of rotation of the first support 20 relative to the second support 40 is shown. In the disclosed embodiment, the range 80 of rotation is approximately one hundred twenty degrees. It should be understood, however, that the present invention is not limited in this regard and a person of ordinary skill in the art and familiar with this disclosure will understand that the range 80 of rotation can vary to between less than one hundred twenty degrees to three hundred sixty degrees.

In reference to FIG. 14, the assembly 10 is shown in the locked position. The assembly 10 is biased between the unlocked position and the locked position by rotating the locking element 70 in a first direction about the axis of rotation AA. The rotation of the locking element 70 advances the threads 74 at the distal end 72 of the shaft 79 through the complementary threads 59 in the opening 57 in the second support 40 causing a linear translation of the locking element 70 relative to the second support 40 along the axis AA. After a period of rotation, the shoulder 75 abuts the first end 61 of the lug 60 thereby forcing it in the direction of the second support 40 along the axis AA. At the same time, an area of the second support 40 near the first end 51 of the second bore 50 abuts an area near the second end 32 of the first bore 30. As the locking element 70 is further rotated in the first direction, the shoulder 75 continues to impart a force on the lug 60 in the direction of the second support 40 along the axis AA. This lug 50 transfers this force to the first support 20 via the complementary threads 36, 66 of the first support 20 and the lug 60. The upward force of the first support 20 is counterbalanced by the downward force of the second support at the interface between the first support and the second support.

As a result of these forces imparted in the assembly 10 in the locked position and/or while biasing the assembly to the locked position, the threads 66 of the lug 60 are compressed against the threads 36 of the first support 20, thereby increasing a friction between the lug and the first support 20. The friction between the complementary threads 36, 66 of the first support 20 and the lug 60 inhibits rotation of the first support relative to the lug about the axis of rotation AA and inhibits rotation of the first support relative to the second support about the axis of rotation AA. It should be understood to a person having ordinary skill in the art that it is possible to increase the friction force by increasing the surface area of the threads.

In addition, as a result of the above described forces imparted in the assembly 10 in the locked position and/or while biasing the assembly to the locked position, the interface between the first support 20 and the second support 40 at the areas proximate to the their second and first ends 32, 51 respectively is subject to compression, thereby increasing a friction between the first support 20 and the second support 40 at their interface. The friction at the interface between the first support 20 and the second support 40 inhibits rotation of the first support relative to the second support about the axis of rotation and inhibits rotation of the first support relative to the lug about the axis of rotation AA.

The assembly 10 is configured so that a user can fix the position of the first support 20 relative to the second support 40 about the axis of rotation AA by rotating the locking element 70 in the first direction with their hand. In this manner, a person can fix the position of the first support 20 relative to the second support 40 about the axis of rotation AA. It has been found that the complementary threads 36, 66 create a larger than expected friction zone to inhibit rotation of the first support 20 relative to the second support 40 about the first axis of rotation AA.

When the assembly 10 is in the locked position, a user can rotate the locking element 70 in a second direction, opposition the first direction, about the axis of rotation AA, thereby decreasing the friction between the lug and the first support and decreasing friction between the first support 20 and the second support 40. This decrease in friction facilitates rotation of the lug 60 relative to the first support 20 about axis AA.

It should be understood that although a specific configuration of the assembly 10 is shown, the present invention is not limited in this regard. For example, the embodiments of the first support 20 and the second support 40 shown in the drawings have a specific length and shape, and include certain connection hardware, i.e. holes, threads, etc. It should be understood that the present invention is not limited this regard. A person having ordinary skill in the art will understand that the first and second supports can have many different configurations depending on the desired application.

Figure 15:
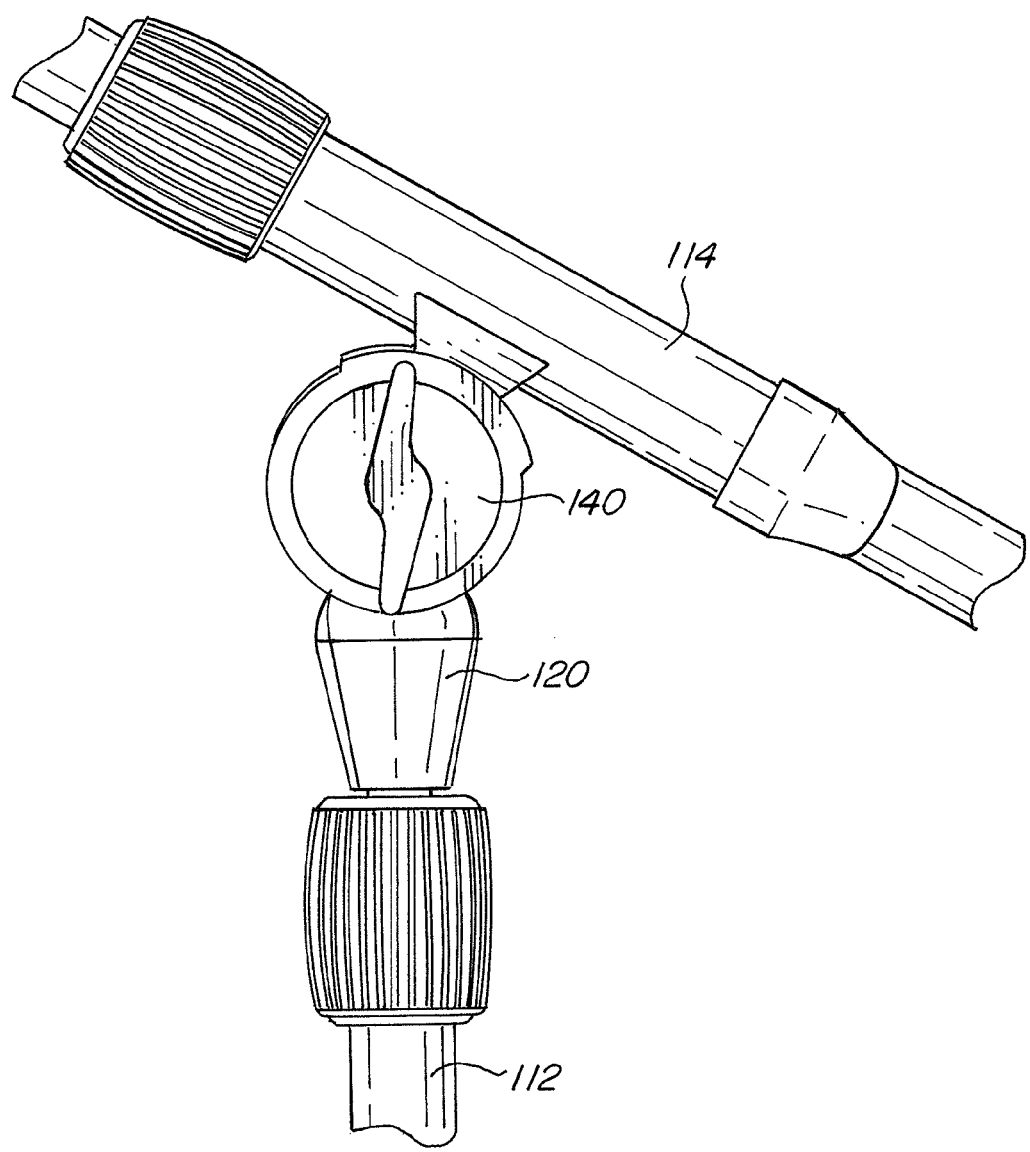
FIG. 15 is a view of a retention and rotation assembly according to another embodiment of the present invention.

In reference to FIG. 15, an assembly 110 in accordance with one embodiment of the present invention is shown. The assembly 110 connects a vertical stand 112 (a portion of which is shown in FIG. 15) and a boom 114 (a portion of which is shown in FIG. 15). The assembly 110 includes a first support 120 connected to the stand 112 and a second support 140 connected to the boom 114. In an unlocked position, the assembly facilitates rotation of the stand 112 relative to the boom 114 about the axis of rotation AA. In the locked position, the assembly 110 inhibits rotation of the stand 112 relative to the boom 114 about the axis AA.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A retention and rotation assembly, comprising:
 a first support having a first bore extending along an axis AA, a threaded surface on an inside of the first bore;
 a lug received in the first bore, the lug being rotatable relative to the first support about the axis AA, a threaded surface on an outside surface of the lug, the lug being in threaded engagement with the first support when the lug is received in the first bore;
 a second support having a second bore, an inside surface of the second bore being engageable with an outside surface of the lug, the second support being fixed relative to the lug about the axis AA when second support is engaged with the lug;
 a locking element extending through a bore in the lug and into at least a portion of the second support;
 wherein a rotation of the locking element in a first direction about the axis AA increases a friction between the lug and the first support thereby inhibiting rotation of the lug relative to the first support about the axis AA, and a rotation of the locking element in a second direction about the axis AA decreases a friction between the lug and the first support thereby facilitating rotation of the lug relative to the first support about the axis AA.

2. The assembly of claim 1, wherein the rotation of the locking element in the first direction increases a friction between the threaded surface on the outside surface of the lug and the threaded surface on the inside surface of the first bore.

3. The assembly of claim 1, wherein the rotation of the locking element in the second direction decreases a friction between the threaded surface on the outside surface of the lug and the threaded surface on the inside surface of the first bore.

4. The assembly of claim 1, wherein the locking element extends between a proximal and distal end.

5. The assembly of claim 1, wherein a portion of the locking element proximate to its distal end is threaded.

6. The assembly of claim 5, further comprising:
 a threaded portion defined by the second support and being configured to receive the threaded portion of the locking element.

7. The assembly of claim 1, wherein the locking element comprises a shoulder proximate to its proximal end.

8. The assembly of claim 7, wherein the rotation of the locking element in the first direction about the axis AA compresses the lug between the second support and the shoulder of the locking element.

9. The assembly of claim 1, wherein an inside surface of the second bore proximate to an end thereof comprises a plurality of alternating teeth and teeth gaps, and wherein an outside surface of the lug proximate to an end thereof comprises a plurality of alternating teeth and teeth gaps, and wherein the teeth and teeth gaps of the second bore are complementary to the teeth and teeth gaps of the lug so that the second bore and the lug are engageable therewith.

10. The assembly of claim 1, wherein the lug and the second support act as a continuous element.

11. A stand comprising:
 a base;
 a first support extending from the base and having a distal end remote therefrom;
 a first bore extending along an axis AA through the distal end of the first support, a threaded surface on an inside of the first bore;
 a lug received in the first bore and being rotatable relative to the first support about the axis AA, a threaded surface on an outside surface of the lug, the lug being in threaded engagement with the first support when the lug is received in the first bore;
 a second support having a distal end, the second support having a second bore remote from the distal end, an inside surface of the second bore being engageable with an outside surface of the lug, the second support being fixed relative to the lug about the axis AA when the second support is engaged with the lug;

a locking element extending through a bore in the lug and into at least a portion of the second support;

wherein a rotation of the locking element in a first direction about the axis AA increases a friction between the lug and the first support thereby inhibiting rotation of the lug relative to the first support about the axis AA, and a rotation of the locking element in a second direction about the axis AA decreases a friction between the lug and the first support thereby facilitating rotation of the lug relative to the first support about the axis AA.

12. The stand of claim 11, wherein the rotation of the locking element in the first direction increases a friction between the threaded surface on the outside surface of the lug and the threaded surface on the inside surface of the first bore.

13. The assembly of claim 11, wherein a rotation of the locking element in the second direction decreases a friction between the threaded surface on the outside surface of the lug and the threaded surface on the inside surface of the first bore.

14. The stand of claim 11 further comprising a clip fixed to the distal end of the second support, the clip being configured to support one or more of a microphone, a tablet, and a camera.

15. The stand of claim 11, wherein the second bore is proximate to a center of the second support between a proximal and the distal end thereof.

* * * * *